United States Patent

Semler et al.

[11] Patent Number: 5,989,330
[45] Date of Patent: Nov. 23, 1999

[54] ACID RESISTANT CEMENT COMPOSITION

[75] Inventors: Charles Semler, Tuscon, Ariz.;
Thomas Hawisher, Savoy, Ill.;
Herman Pieterse, Tuscon, Ariz.;
Richard Williams, Toronto, Canada

[73] Assignee: Barrick Gold Corporation, Ontario, Canada

[21] Appl. No.: 08/989,728

[22] Filed: Dec. 12, 1997

[51] Int. Cl.⁶ .............................. C09D 1/00; C09D 1/06
[52] U.S. Cl. ................................ 106/286.1; 106/286.2; 106/286.5; 106/286.8; 106/287.17; 106/287.34; 501/133; 501/128; 501/154; 501/153
[58] Field of Search ..................... 501/133, 154, 501/128, 153; 106/286.8, 287.34, 286.17, 286.2, 286.5

[56] References Cited

U.S. PATENT DOCUMENTS

| | | | |
|---|---|---|---|
| 2,914,413 | 11/1959 | Mercer | 106/84 |
| 3,656,977 | 4/1972 | Dreyling et al. | 106/55 |
| 3,957,520 | 5/1976 | Linton | 501/133 |
| 4,030,939 | 6/1977 | Mallow | 106/74 |
| 4,056,399 | 11/1977 | Kirkpatrick et al. | 501/133 |
| 4,061,501 | 12/1977 | Ivarsson et al. | 106/44 |
| 4,255,195 | 3/1981 | Holter et al. | 501/133 |
| 4,259,120 | 3/1981 | Rueckl | 106/58 |
| 4,263,048 | 4/1981 | Hacker | 106/84 |
| 4,334,029 | 6/1982 | Naito et al. | 501/109 |
| 4,597,796 | 7/1986 | Ernst et al. | 106/74 |
| 4,992,103 | 2/1991 | Smart | 106/695 |
| 5,071,477 | 12/1991 | Thomas et al. | 75/744 |
| 5,147,830 | 9/1992 | Banerjee et al. | 501/128 |
| 5,238,518 | 8/1993 | Okubi et al. | 501/133 |
| 5,296,027 | 3/1994 | Ernst et al. | 106/630 |
| 5,360,773 | 11/1994 | Winkelbauer et al. | 501/133 |
| 5,422,323 | 6/1995 | Banerjee et al. | 501/128 |
| 5,489,326 | 2/1996 | Thomas et al. | 75/744 |
| 5,494,267 | 2/1996 | Anderson et al. | 501/103 |

FOREIGN PATENT DOCUMENTS

| | | | |
|---|---|---|---|
| 0 417 898 | 3/1991 | European Pat. Off. | C21C 5/44 |
| 0 425 086 | 5/1991 | European Pat. Off. | B22D 41/02 |
| 294 702 | 5/1990 | Germany | C04B 35/66 |
| 1085594 | 10/1967 | United Kingdom | C09K 3/00 |
| 1123773 | 8/1968 | United Kingdom | C01B 33/12 |

OTHER PUBLICATIONS

Fujii et al., Agents for Treating Substrate Surfaces, Abstract No. 141397q, Oct. 7, 1991.
XP–002089600, Derwent Publications Ltd., Sep. 26, 1995.

*Primary Examiner*—Michael Marcheschi
*Attorney, Agent, or Firm*—Senniger, Powers, Leavitt & Roedel

[57] ABSTRACT

A cement composition for use in acidic environments containing an acid resistant particulate aggregate of fused mullite aggregate or other aggregate material, with quartz, and microsilica in combination with a colloidal silica sol binder and being substantially free of Na compounds and K compounds which react in the presence of sulfuric acid to form alkali sulfates in service, thus reducing the durability or the service life.

31 Claims, 2 Drawing Sheets

ACID RESISTANT CEMENT COMPOSITION

BACKGROUND OF THE INVENTION

This invention relates to cement compositions, and especially to cement compositions useful as mortar with refractory brickwork linings in thermal/chemical processing applications. One specific example is the high pressure autoclaves used in the acidic oxidation of refractory precious metal ores.

There are precious metal ores that are of refractory type, in which the metallic phase(s) of interest is not readily recoverable by cyanidation and other known techniques, unless the ores are first oxidized. One oxidation technique that is used is high pressure oxidation in an autoclave. Pressure oxidation methods and autoclaves are described, for example, in Thomas et al., U.S. Pat. Nos. 5,071,477 and 5,489,326. Such autoclaves are typically brickwork-lined (acid resistant refractory bricks and mortar) and the lining must withstand temperatures of 400°–460° F. and pressure oxidation conditions including total pressure in the range of about 400–500 psig, oxygen partial pressure of greater than about 20 psi, and agitated ore slurry contents of up to 25 or more g/L sulfuric acid.

The most common mortars now used in autoclave applications, and in the past, have included alkali silicate containing mortars and other alkali compound containing mortars. The alkali content of these mortars has limited the mortars' life because the alkali-containing phase(s) tends to react in the presence of sulfuric acid to form alkali sulfates, and other altered compounds, which are subject to significant expansion and volume change. This effect can cause or contribute to the breakdown of brickwork, because of associated stresses, cracking and strength loss that accompany the brick and mortar alteration in use.

U.S. Pat. No. 2,914,413 discloses a cold-setting acid corrosion resistant cement comprising an aqueous silica sol and solid alkali metal silicate setting agents. The cement is stated to be of reduced sodium content, due to its use of a very low sodium (less than 0.5%) source of silica for its binder, whereby problems associated with sodium content are reduced. However, potential problems associated with reaction effects, like the conversion and volume expansion of alkali metal sulfates, remain because of the incorporation of alkali metal silicate (sodium silicate) setting agents.

SUMMARY OF THE INVENTION

Among the several objects of this invention, therefore, is the development of a cement composition, that among its applications, is mortar for brick linings for high pressure oxidation autoclaves for processing refractory precious metal ores, i.e., a mortar having excellent resistance to water and steam solubility and improved resistance to acid attack and breakdown under high pressure chemical/oxidation conditions, which does not include any halogen-, phosphate-, or alkali-containing setting agents.

Briefly, therefore, the invention is directed to a pre-cured cement composition for use as a mortar in acidic autoclave environments comprising an aqueous colloidal silica sol binder and an appropriate aggregate and a fine-particle size matrix fraction.

In one aspect, the invention is directed to a pre-cured cement composition for use as a mortar in acidic autoclave environments comprising an aqueous colloidal silica sol binder and an filler comprising fused oxide aggregate and microsilica.

The invention is also directed to a pre-cured cement composition for use as a mortar in acidic autoclave environments comprising an aqueous colloidal silica sol binder and an filler comprising fused mullite aggregate and microsilica.

The invention is also directed to a pre-cured cement composition in which the filler comprises about 10–15% by weight microsilica, and one in which the filler comprises about 35–50% by weight fused mullite aggregate.

The invention is also directed to a pre-cured cement composition consisting essentially of a substantially Na-free and substantially K-free particulate ceramic filler material and a substantially Na-free and substantially K-free aqueous silica sol binder.

Further, the invention is directed to a cured cement composition for use in acidic environments, the composition comprising an acid resistant particulate aggregate and a silica bond and being substantially free of Na compounds and K compounds which react in the presence of sulfuric acid to form alkali sulfates upon exposure to acidic environments in service.

The invention is still further directed to a cured cement composition for use in acidic autoclave environments comprising an acid resistant particulate filler comprising fused mullite aggregate and microsilica, and a silica bond, the composition being prepared from a pre-cured composition which is substantially free of alkali metal binder setting agents.

The invention is also directed to a pre-cured cement composition consisting essentially of an aqueous colloidal silica sol binder and a filler comprising about 35–50% by weight fused mullite aggregate, about 40–50% by weight quartz, and about 10–15% by weight microsilica.

And the invention is directed to a cured cement composition for use in acidic autoclave environments prepared without the use of alkali metal binder setting agents, consisting essentially of the following, by weight percent:

| | |
|---|---|
| $SiO_2$ | 66.89 |
| $Al_2O_3$ | 32.75 |
| $Fe_2O_3$ | 0.06 |
| $TiO_2$ | 0.01 |
| MgO | 0.01 |
| CaO | 0.06 |
| $Na_2O$ | 0.14 |
| $K_2O$ | 0.06 |
| Other Impurities | 0.02 |

Other objects and features of the invention will be in part apparent, and in part described hereafter.

DETAILED DESCRIPTION OF THE INVENTION

Figure 1:
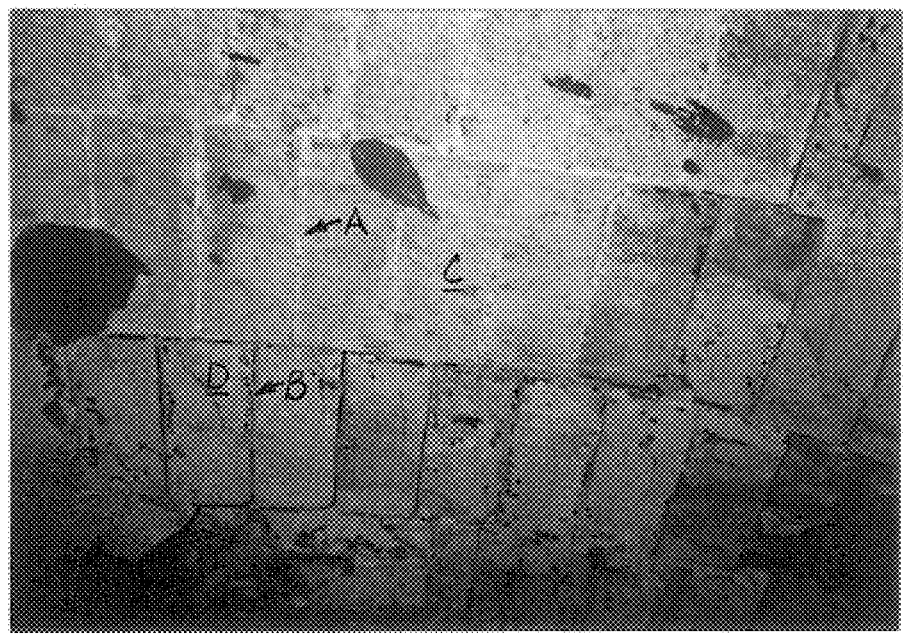
FIG. 1 is an illustration of the mortar of the invention applied to secure brickwork.

The cement composition of the invention is particularly useful as a mortar for securing bricks in applications requiring acid resistance at elevated temperatures and pressures as are encountered in autoclaves used in metal recovery operations. Its use extends to other applications such as chemical processes and the like. The pre-cured composition comprises filler and liquid binder and is prepared by mixing the dry filler materials with about 15% to 25% by weight binder. The mixing should be done preferably in the temperature range of 60 to 90° F. A mixer such as a single blade bucket mixer (30–40 rpm) is acceptable for homogenizing the dry mix and liquid binder in the field. The liquid binder is an aqueous dispersion of colloidal (submicron-sized) silica particles, of 15% to 50% silica content by weight. Binders of this type, for example, designated as Nalco 1140 or Nalco 1130, are available from Nalco Chemical Co. of Chicago, Ill. Equivalent versions are available from other suppliers. The use of a colloidal silica binding system resulting in an amorphous silica bond is believed to play a substantial role in the improved performance of the mortar of the invention as compared to mortars such as the comparative commercial mortar in example 3, which employ alkali silicate based binder systems.

The dry filler can contain a mixture of size-graded materials selected from fused white or brown alumina ($Al_2O_3$), tabular alumina ($Al_2O_3$), fused mullite ($3Al_2O_3 \cdot 2SiO_2$), kyanite ($Al_2O_3 \cdot SiO_2$), quartz ($SiO_2$), microsilica ($SiO_2$), and other possible filler materials, such as fused/vitreous silica ($SiO_2$), titania ($TiO_2$), zircon ($ZrO_2 \cdot SiO_2$), and the like, that may provide property and/or performance benefits for the conditions of certain applications. The particle size of the coarse aggregate ranges between about 30 and 100 mesh. The particle size of the intermediate fraction is between about 100 and 325 mesh, and the fine fraction is minus 325 mesh. The particle sizes used, and distribution, are very important because of their direct contribution to benefits such as trowelability, workability, adherence, and hardening. But experience has shown that many combinations of materials can be used, according to the requirements and conditions of the application.

The use of 35% to 50% by weight fused mullite in one preferred embodiment of the invention has proven to provide improved long term durability in autoclave service. Fused mullite is distinct from sintered mullite in that the fused structure corresponds to a much larger crystal size and no intragranular porosity. Thus, there are fewer crystal boundaries and pores, and therefore there are fewer avenues for penetration of the mortar by the attacking species in the autoclave environment, and therefore less opportunity for reaction and resulting deterioration. This use of fused mullite therefore provides improved durability over mortars using other aggregates, sintered mullite in particular. This use of a large portion of fused mullite also represents an improvement over many prior mortars for chemical and acid resistant applications, which have employed quartz as the major aggregate component. Other fused oxide materials such as fused silica, fused white alumina, and fused brown alumina, are usable in a manner similar to fused mullite.

Alumina suitable for this mortar is available from C-E Minerals, King-of-Prussia, Pa., Washington Mills Electro Minerals Corp., Niagara Falls, N.Y., and Alcoa Industrial Chemicals, Pittsburgh, Pa. Fused mullite is also available from Washington Mills Electro Minerals Corp. and others. Fused silica can be purchased from C-E Minerals, Greeneville, Tenn. Quartz of suitable particle sizing can be obtained from several suppliers, such as U.S. Silica, Ottawa, Ill. Microsilica is available from Elkem Materials, Pittsburgh, Pa. Sources of the other filler materials can be found in any current catalog of ceramic raw materials suppliers.

The use of microsilica has been found to be important to the long term durability of the mortar of the invention. Microsilica is amorphous, as opposed to quartz, which is crystalline, and is therefore fundamentally different in form from crystalline silica. Microsilica is referred to in the industry as "V.S." or "volatilized silica" because it is condensed and filtered from a vapor containing volatilized silica. It is produced, for example, by collection of silica fume from the production of silicon metal in electric furnaces. Without being bound to a particular theory, it is thought that the microsilica assists in setting the binder by triggering precipitation of the aqueous colloidal silica dispersion. The spherical submicron (median size about 0.15 micron) particle size has been found to be especially important in improving the creaminess, workability, and trowelability of the mortar as compared to prior mortars. The matrix fraction contains between about 10 and about 15 wt. % microsilica. One preferred embodiment has, for example, about 12% by weight microsilica. The workability of the mortar of the invention is enhanced, due in substantial part to the use of microsilica in accordance with the foregoing parameters. The adhesion of the mortar is also much improved over, for example, mortars of the type disclosed in U.S. Pat. No. 2,914,413, due in substantial part to the use of microsilica, in accordance with the foregoing parameters.

Because the use of microsilica is thought to contribute to the achievement of acceptable strength without the use of setting agents, setting agents are dispensed with, and there is no concern as to whether the mortar is mixed sufficiently to achieve homogeneous dispersion of setting agents, as there is with mortars which employ setting agents. The failure to achieve homogeneous dispersion of setting agents can result in non-uniform strength in these other mortars. Furthermore, many such setting agents can be problematic, due to their hygroscopic and reactive properties.

Because the composition of the invention is preferably prepared without the use of setting agents, and especially without the use of alkali metal silicate setting agents employed in prior mortars, the alkali content of the cured composition is reduced. Because alkali content is thought to react and/or be leached out during service in acidic autoclave environments, reducing such content improves long-term durability of the mortar in service. It is not practical to completely eliminate all alkali because it is present in trace amounts in most of the materials used in the formulation. The pre-cured and cured compositions are substantially free of Na and K, and preferably substantially free of all alkali metals, in that they contain less than about 1% by weight Na and K combined, preferably less than about 1% by weight of all alkali metals (Li, Na, K, Rb, Cs, Fr) combined, more preferably less than about 0.5% by weight of Na and K, and most preferably less than about 0.5% by weight of all alkali metals combined. Further preferred embodiments have less than about 0.3% by weight Na and K, more preferably less than about 0.3% by weight of all alkali metals combined. Further preferred embodiments have substantially no quantity of the alkaline-earth metals Sr, Ba, Ra or Be.

Although the foregoing advantages are achieved by the elimination of setting agents, it remains possible to use setting agents in connection with the mortars of the invention. This option would be considered in applications where it is more important to set the mortar quickly than to achieve the longer term durability associated with eliminating setting agents.

Various formulations are within the scope of the invention. One such preferred embodiment of the invention consists essentially of, by weight percent, about:

| | |
|---|---|
| SiO$_2$ | 61–75 |
| Al$_2$O$_3$ | 25–37 |
| Fe$_2$O$_3$ | up to about 0.2 |
| TiO$_2$ | up to about 0.1 |
| MgO | up to about 0.1 |
| CaO | up to about 0.1 |
| Na$_2$O | no more than about 0.3 |
| K$_2$O | no more than about 0. |
| Other Impurities | up to about 0.1 |

In preparing the cement composition of this invention, the ingredients can be mixed using most any type of mixer, such as double cone, paddle, or blade, although a type that provides thorough and uniform homogenization, with choppers, or some other means of breaking up agglomerates, is preferred. The cleanliness of the mixer is very important, as the pickup of any amount of contaminant(s) can degrade the workability and properties of the mortar.

Although the primary use of the cement composition of the invention is as a mortar for securing bricks, it is also useful as a patching material, and possibly for casting into bricks, or as a continuous coating or lining, all for use in applications requiring acid resistance at elevated temperatures as are encountered in autoclaves. Use as a castable material (for example, for bricks) requires addressing problems associated with non-uniform drying and resulting surface cracking of relatively large cross sections. A continuous coating or lining can be applied by trowelling, and perhaps by spraying with a pressure gun.

Further illustration of the characteristics and practical advantages of the compositions described in this invention is provided in the following examples:

EXAMPLE 1

A batch with coarse aggregate of 35–50 wt. % fused mullite having a particle size of minus 30 mesh, 40–50 wt. % quartz having a particle size of minus 70 mesh, and 10–15 wt. % microsilica having a particle size of minus 325 mesh, was mixed with 16 wt. % colloidal silica binder. The representative chemical analysis of the resulting mortar, after curing, on a weight percent basis, is shown below:

| | |
|---|---|
| SiO$_2$ | 66.89 |
| Al$_2$O$_3$ | 32.75 |
| Fe$_2$O$_3$ | 0.06 |
| TiO$_2$ | 0.01 |
| MgO | 0.01 |
| CaO | 0.06 |
| Na$_2$O | 0.14 |
| K$_2$O | 0.06 |
| TOTAL | 99.98 |

Cylinders 0.5" diameter×1" long were prepared for determination of the strength development with increasing time. For direct comparison, cylinders (of the same size) of a commercial alkali-silicate mortar (potassium silicate based mortar having no microsilica and employing an aluminum phosphate setting agent) that is widely used in autoclave brickwork linings were prepared (using the manufacturer's specified powder/liquid ratio) and cured at about 75° F. for strength testing. The following results were obtained:

| | Crushing Strength, lbs/sq.in. | |
|---|---|---|
| Air Setting Time | Mortar of the Invention | Commercial Mortar |
| 3 hrs | 285 | 13 |
| 6 | 674 | 53 |
| 12 | 1643 | 151 |
| 24 | 1719 | 386 |
| 3 days | 1772 | 1024 |
| 7 days | 2105 | 2466 |

The compressive strength of the cement composition is at least about 600 psi after six hours curing time at about 75° F. The more rapid strength development of this mortar has proven in field trials that lining installation and repairs can be done faster, because the brickwork supports can be removed in less than 8 hours, contrasted with 8 or more hours for the commercial alkali-silicate mortar.

The cured cement composition of the invention reaches a desired compressive strength more quickly than commercial mortar having an alkali silicate binder, with an aluminum phosphate setting agent, and lacking microsilica. In particular, the cured cement composition of the invention achieves a compressive strength of 300 psi in less than one-fourth the curing time required for a commercial mortar having an alkali silicate binder, with an aluminum phosphate setting agent, and lacking microsilica.

EXAMPLE 2

Field testing of versions of this mortar (1" square×4" long bars) in the vapor zone of an operating commercial pressure oxidation autoclave has proven that it retains more strength for a longer time, under service conditions, than the standard commercial alkali-silicate mortar used in the industry today. The following representative strength data, which have been reconfirmed several times, provide documentation of this observation:

| | Flexural Strength, lbs/sq.in. After Exposure |
|---|---|
| Mortar of the invention | 4019 (272 days) |
| | 4138 (272 days) |
| | 3947 (272 days) |
| | 4035 (avg.; 272 days) |
| Commercial Alkali-Silicate Mortar | 1365 (195 days) |
| | 1278 (430 days) |

The cured cement composition of the invention has a flexural strength greater than that of a commercial mortar having an alkali silicate binder, with an aluminum phosphate setting agent, and lacking microsilica. Moreover, the cured cement composition of the invention has a flexural strength after 200 days of exposure to acidic vapor in an operative autoclave of at least about two times the flexural strength of a commercial mortar having an alkali silicate binder, with an aluminum phosphate setting agent, and lacking microsilica.

EXAMPLE 3

A batch with coarse aggregate of 35–50 wt. % fused mullite having a particle size range of minus 30 mesh, 40–50 wt. % fine-grained quartz having a particle size of minus 70 mesh, and 10–15 wt. % microsilica having a particle size of minus 325 mesh, was mixed in the field for approximately 5 minutes with 18–20 wt. % Nalco 1140 colloidal silica binder in a fixed blade, rotating bucket mixer.

Test panels of fireclay brickwork (30–60 bricks) installed with a version of this new silicate mortar in two operating commercial pressure oxidation autoclaves, have confirmed that the previously mentioned strength advantage results in improved durability. Test panels exposed for more than two years have shown that this mortar retains its integrity much better than the standard commercial alkali-silicate mortar. It has also been observed that because the mortar joint integrity is better, there is less penetration and reaction along the joints, so the brick deterioration is reduced.

Figure 2:
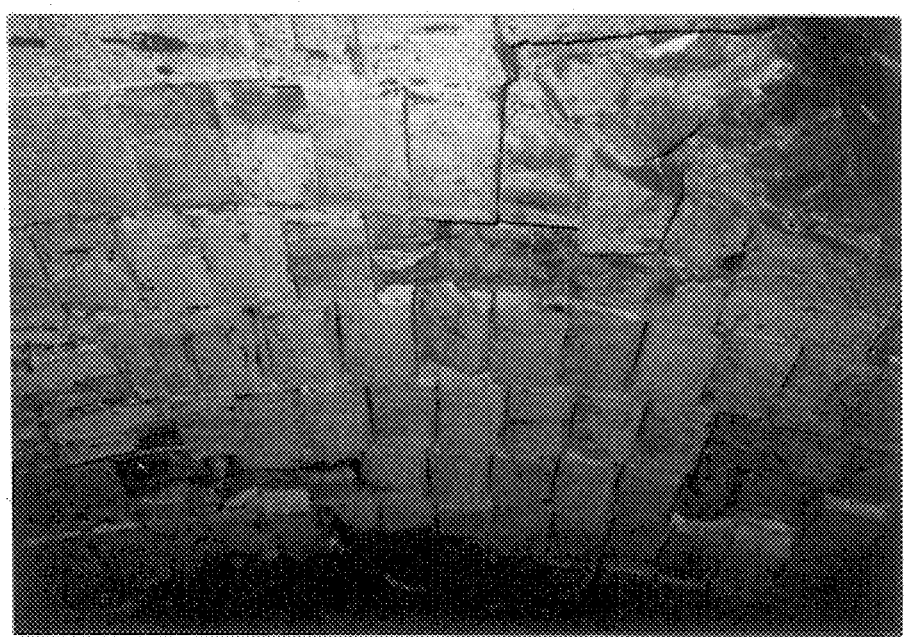
FIG. 2 is an illustration of prior art mortar.

As shown in FIG. 1, after 527 days exposure, mortar of the invention (indicated at A) has more integrity than adjacent commercial mortar, which is alkali-silicate based mortar without microsilica, (indicated at B) and that the bricks (indicated at C) surrounded by the mortar composition of the invention suffer less wear and cracks than as at, e.g., location D. Increased deterioration of bricks as shown at D appears to result from their suffering acid attack on five sides, rather than one side, as a result of mortar deterioration. The deterioration shown at B and D in FIG. 1 eventually progresses to that shown in FIG. 2, which progression is greatly retarded by use of the cement composition of the invention.

EXAMPLE 4

Figure 3:
FIG. 3 is an illustration of the mortar of the invention used as a patching compound.

A mortar composition of a type as described above was used as a patching compound and applied to replace deteriorated brickwork as shown in FIG. 3 at E. The photograph of FIG. 3 was taken after 527 days (1.44 years) of exposure under actual service conditions, and shows that the composition remained in place and intact. Prior commercial mortar compositions containing alkali silicate binding systems are mainly useful only for filling joints between bricks because they progressively deteriorate (soften) in service as discussed above and as shown in FIGS. 1–3.

As various changes could be made in the above embodiments without departing from the scope of the invention, it is intended that all matter contained in the above description shall be interpreted as illustrative and not in a limiting sense.

What is claimed is:

1. A pre-cured cement composition for use as a mortar in acidic autoclave environments, the composition consisting essentially of an aqueous colloidal silica sol binder, fused oxide aggregate, and microsilica.

2. A pre-cured cement composition for use as a mortar in acidic autoclave environments comprising an aqueous colloidal silica sol binder, a fused mullite aggregate, and microsilica.

3. A pre-cured cement composition for use as a mortar in acidic autoclave environments, the composition consisting essentially of an aqueous colloidal silica sol binder and a filler consisting essentially of quartz and about 35–50% by weight fused oxide aggregate.

4. A pre-cured cement composition for use as a mortar in acidic autoclave environments, the composition consisting essentially of an aqueous colloidal silica sol binder and a filler consisting essentially of quartz and about 35–50% by weight fused oxide aggregate, wherein the fused oxide aggregate is fused mullite.

5. A pre-cured cement composition for use as a mortar in acidic autoclave environments, the composition consisting essentially of an aqueous colloidal silica sol binder, and filler material consisting essentially of quartz, fused oxide aggregate, and about 10–15% by weight microsilica.

6. A pre-cured cement composition for use in elevated temperature acidic environments consisting essentially of a substantially Na-free and substantially K-free particulate ceramic filler material and a substantially Na-free and substantially K-free aqueous colloidal silica sol binder.

7. A cured cement composition for use in elevated temperature acidic environments, the composition consisting essentially of
   (a) acid resistant particulate materials; and
   (b) an amorphous silica bond;
   wherein the composition is substantially free of Na compounds and K compounds which react in the presence of sulfuric acid to form alkali sulfates upon exposure to acidic environments.

8. The cured cement composition of claim 7 comprising no more than 0.5% by weight Na and K.

9. The cured cement composition of claim 8 further consisting essentially of no more than 0.5% by weight Li, Rb, Cs, and Fr.

10. The cured cement composition of claim 7 comprising no more than 0.3% by weight Na and K.

11. The cured cement composition of claim 10 further consisting essentially of no more than 0.3% by weight Li, Rb, Cs, and Fr.

12. The cured cement composition of claim 7 consisting essentially of, by weight percent, about:

| | |
|---|---|
| $SiO_2$ | 61–75 |
| $Al_2O_3$ | 25–37 |
| $Fe_2O_3$ | up to about 0.2 |
| $TiO_2$ | up to about 0.1 |
| MgO | up to about 0.1 |
| CaO | up to about 0.1 |
| $Na_2O$ | no more than about 0.3 |
| $K_2O$ | no more than about 0.1 |
| Other Impurities. | up to about 0.1 |

13. A cured cement composition for use in elevated temperature acidic environments, the composition consisting essentially of
   (a) acid resistant particulate materials; and
   (b) an amorphous silica bond;
   wherein the composition is substantially free of Na compounds and K compounds which react in the presence of sulfuric acid to form alkali sulfates upon exposure to acidic environment
   wherein (a) comprises microsilica and an acid resistant particulate aggregate of fused mullite; the composition being prepared from a pre-cured composition which is substantially free of alkali metal binder setting agents.

14. The composition of claim 13 further comprising quartz.

15. The cured cement composition of claim 13 having a flexural strength after 200 days of exposure to acidic vapor of at least about 3000 lbs. per square inch.

16. The cured cement composition of claim 13 having a compressive strength of at least about 600 psi after six hours curing time at 75° F.

17. A pre-cured cement composition for use in elevated temperature acidic environments consisting essentially of an aqueous colloidal silica sol binder and a filler comprising about 35–50% by weight fused mullite aggregate, about 40–50% by weight quartz, and about 10–15% by weight microsilica.

18. The pre-cured cement composition of claim 17 wherein the mullite, quartz, and microsilica in combination constitute between about 75% and 85% of the composition by weight and the aqueous binder constitutes between about 15% and 25% of the composition by weight.

19. The pre-cured cement composition of claim 17 wherein the filler comprises about 12% microsilica by weight.

20. A cured cement composition for use in acidic autoclave environments prepared without the use of alkali metal binder setting agents consisting essentially of the following, by weight percent:

| | |
|---|---|
| $SiO_2$ | 66.89 |
| $Al_2O_3$ | 32.75 |
| $Fe_2O_3$ | 0.06 |
| $TiO_2$ | 0.01 |
| MgO | 0.01 |
| CaO | 0.06 |
| $Na_2O$ | 0.14 |
| $K_2O$ | 0.06 |
| Other Impurities. | 0.02 |

21. A pre-cured cement composition for use in elevated temperature acidic environments, the composition consisting essentially of an aqueous colloidal silica sol binder, microsilica, and an oxide aggregate comprising fused oxide compounds.

22. A pre-cured cement composition for use in elevated temperature acidic environments, the composition consisting essentially of an aqueous colloidal silica sol binder, microsilica, quartz, and an oxide aggregate comprising fused oxide compounds.

23. A pre-cured cement composition for use in elevated temperature acidic environments, the composition consisting essentially of an aqueous colloidal silica sol binder, fused oxide aggregate, and microsilica.

24. A pre-cured cement composition for use in elevated temperature acidic environments, the composition consisting essentially of an aqueous colloidal silica sol binder and a filler consisting essentially of quartz and about 35–50% by weight fused oxide aggregate.

25. A pre-cured cement composition for use in elevated temperature acidic environments, the composition consisting essentially of an aqueous colloidal silica sol binder, and filler material consisting essentially of quartz, fused oxide aggregate, and about 10–15% by weight microsilica.

26. The pre-cured cement composition of claim 3 wherein said filler consists essentially of about 40–50% by weight quartz and about 35–50% by weight fused oxide aggregate.

27. The pre-cured cement composition of claim 5 wherein said filler consists essentially of about 40–50% by weight quartz, about 10–15% by weight microsilica, and about 35–50% by weight fused oxide aggregate.

28. The pre-cured cement composition of claim 24 wherein said filler consists essentially of about 40–50% by weight quartz and about 35–50% by weight fused oxide aggregate.

29. The pre-cured cement composition of claim 25 wherein said filler consists essentially of about 40–50% by weight quartz, about 10–15% by weight microsilica, and 35–50% by weight fused oxide aggregate.

30. A pre-cured cement composition for use as a mortar in acidic autoclave environments, the composition consisting essentially of an aqueous colloidal silica sol binder and a filler consisting essentially of quartz, microsilica and about 35–50% by weight fused oxide aggregate.

31. A pre-cured cement composition for use in elevated temperature acidic environments, the composition consisting essentially of an aqueous colloidal silica sol binder and a filler consisting essentially of quartz, microsilica and about 35–50% by weight fused oxide aggregate.

* * * * *